(12) United States Patent
Cichon

(10) Patent No.: US 7,946,371 B1
(45) Date of Patent: May 24, 2011

(54) SNOWMOBILE SUSPENSION

(76) Inventor: Kevin F. Cichon, Monticello, MN (US)

( * ) Notice: Subject to any disclaimer, the term of this patent is extended or adjusted under 35 U.S.C. 154(b) by 147 days.

(21) Appl. No.: 12/401,916

(22) Filed: Mar. 11, 2009

(51) Int. Cl.
 *B62M 27/02* (2006.01)
(52) U.S. Cl. .................. 180/190; 180/41; 280/6.154
(58) Field of Classification Search .................. 180/186, 180/190, 183, 184, 185, 11, 41, 89.14; 280/6.154, 280/17, 5.511, 5.508, 6.16
See application file for complete search history.

(56) References Cited

U.S. PATENT DOCUMENTS

| 3,583,507 | A | * | 6/1971 | Trautwein | 180/190 |
| 4,088,199 | A | * | 5/1978 | Trautwein | 180/209 |
| 6,530,582 | B2 | * | 3/2003 | Dempster | 280/22.1 |
| 2008/0258416 | A1 | * | 10/2008 | Wilcox | 280/124.103 |

* cited by examiner

*Primary Examiner* — Anne Marie Boehler
(74) *Attorney, Agent, or Firm* — David A. Lingbeck

(57) ABSTRACT

A snowmobile suspension for allowing snowmobiles to more easily manage curves and moguls without the skis riding on their edges. The snowmobile suspension includes a base member being attached to a chassis of a snowmobile, and also includes a biased pivot assembly being supported by the base member and being attached to a body of the snowmobile to allow the body of the snowmobile to biasedly pivot relative to the chassis.

3 Claims, 4 Drawing Sheets

SNOWMOBILE SUSPENSION

BACKGROUND OF THE INVENTION

1. Field of the Invention

The present invention relates to snowmobile suspensions and more particularly pertains to a new snowmobile suspension for allowing snowmobiles to more easily manage curves and moguls without the skis riding on their edges and to prevent riders from being jostled off the snowmobiles.

2. Description of the Prior Art

The use of snowmobile suspensions is known in the prior art. More specifically, snowmobile suspensions heretofore devised and utilized are known to consist basically of familiar, expected and obvious structural configurations, notwithstanding the myriad of designs encompassed by the crowded prior art which have been developed for the fulfillment of countless objectives and requirements.

The prior art includes U.S. Pat. No. 5,029,664, which comprises a snowmobile with each ski having a linkage and each linkage having a spindle arrangement with the chassis having an upper suspension linkage and a lower suspension linkage. Another prior art includes U.S. Pat. No. 7,249,647 which comprises a snowmobile with each ski having a shock absorber and a spring with each shock absorber being connected to the linkage of the steering mechanism. Also, another prior art includes U.S. Pat. No. 6,125,958 which comprises a snowmobile with each ski being carried at the front end of a trailing arm with the rear end of the trailing arm being pivotally connected to the chassis and the front end of the trailing arm being pivotally secured to the chassis by a pair of radius rods. Further, another prior art includes U.S. Pat. No. 6,234,262 which comprises a snowmobile with a steering linkage connecting a steering handle with a steering spindle on each ski and also comprises a pair of shock absorbers each being connected between the steering linkage and a respective ski. Yet another prior art includes U.S. Pat. No. 4,372,567 which comprises a snowmobile having an element that is movable with each of the skis with each element being coupled to a torsion bar for loading the torsion bar upon relative vertical movement between the skis. While these devices fulfill their respective, particular objectives and requirements, the aforementioned patents do not disclose a new snowmobile suspension.

SUMMARY OF THE INVENTION

The general purpose of the present invention, which will be described subsequently in greater detail, is to provide a new snowmobile suspension which has many of the advantages of the snowmobile suspensions mentioned heretofore and many novel features that result in a new snowmobile suspension which is not anticipated, rendered obvious, suggested, or even implied by any of the prior art snowmobile suspensions, either alone or in any combination thereof. The present invention includes a base member being attached to a chassis of a snowmobile, and also includes a biased pivot assembly being supported upon the base member and being attached to a body of the snowmobile to allow the body of the snowmobile to biasedly pivot relative to the chassis. None of the prior art includes the combination of the elements of the present invention.

There has thus been outlined, rather broadly, the more important features of the snowmobile suspension in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new snowmobile suspension which has many of the advantages of the snowmobile suspensions mentioned heretofore and many novel features that result in a new snowmobile suspension which is not anticipated, rendered obvious, suggested, or even implied by any of the prior art snowmobile suspensions, either alone or in any combination thereof.

Still another object of the present invention is to provide a new snowmobile suspension so that snowmobiles more easily manages curves and moguls without the skis riding up on their edges.

Still yet another object of the present invention is to provide a new snowmobile suspension that prevents the user from being jostled off the snowmobile because of the skis grabbing the ground.

Even still another object of the present invention is to provide a new snowmobile suspension that allows the user to better maintain control of the snowmobile over mounds, ditches, any rough terrain including turning corners.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
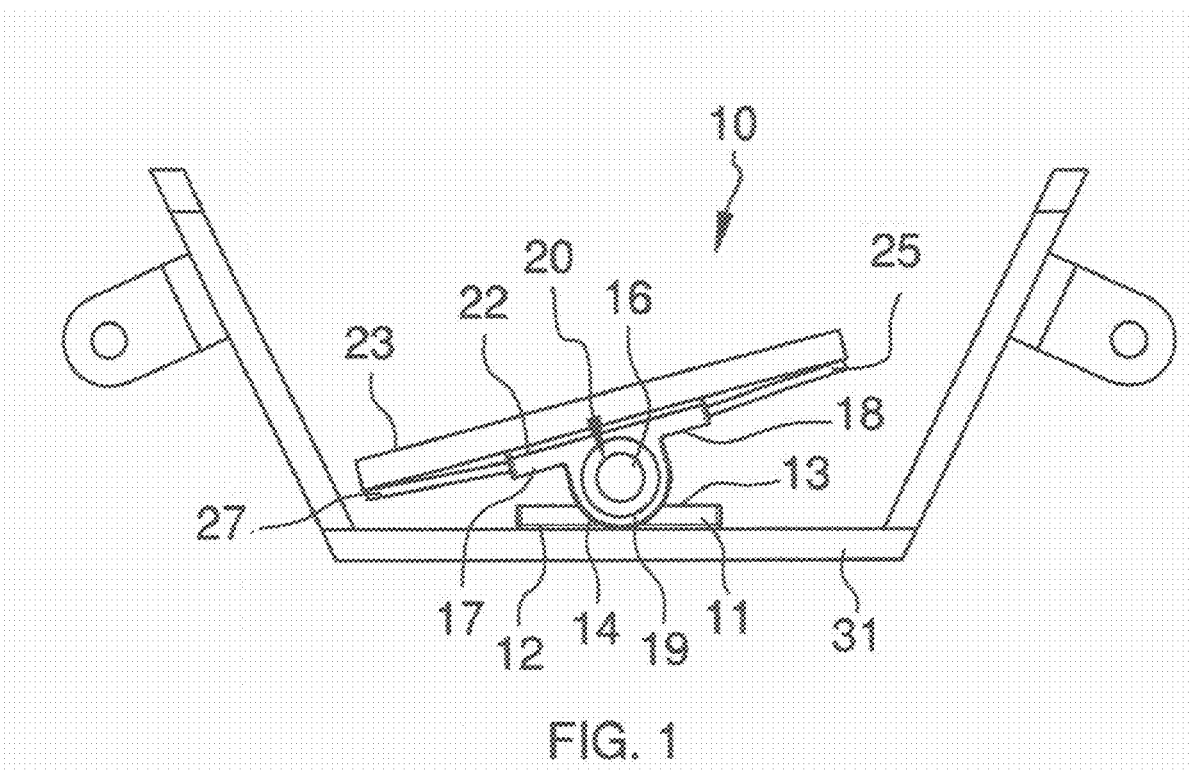
FIG. 1 is a front elevational view of a snowmobile with a new snowmobile suspension according to the present invention.
Figure 2:
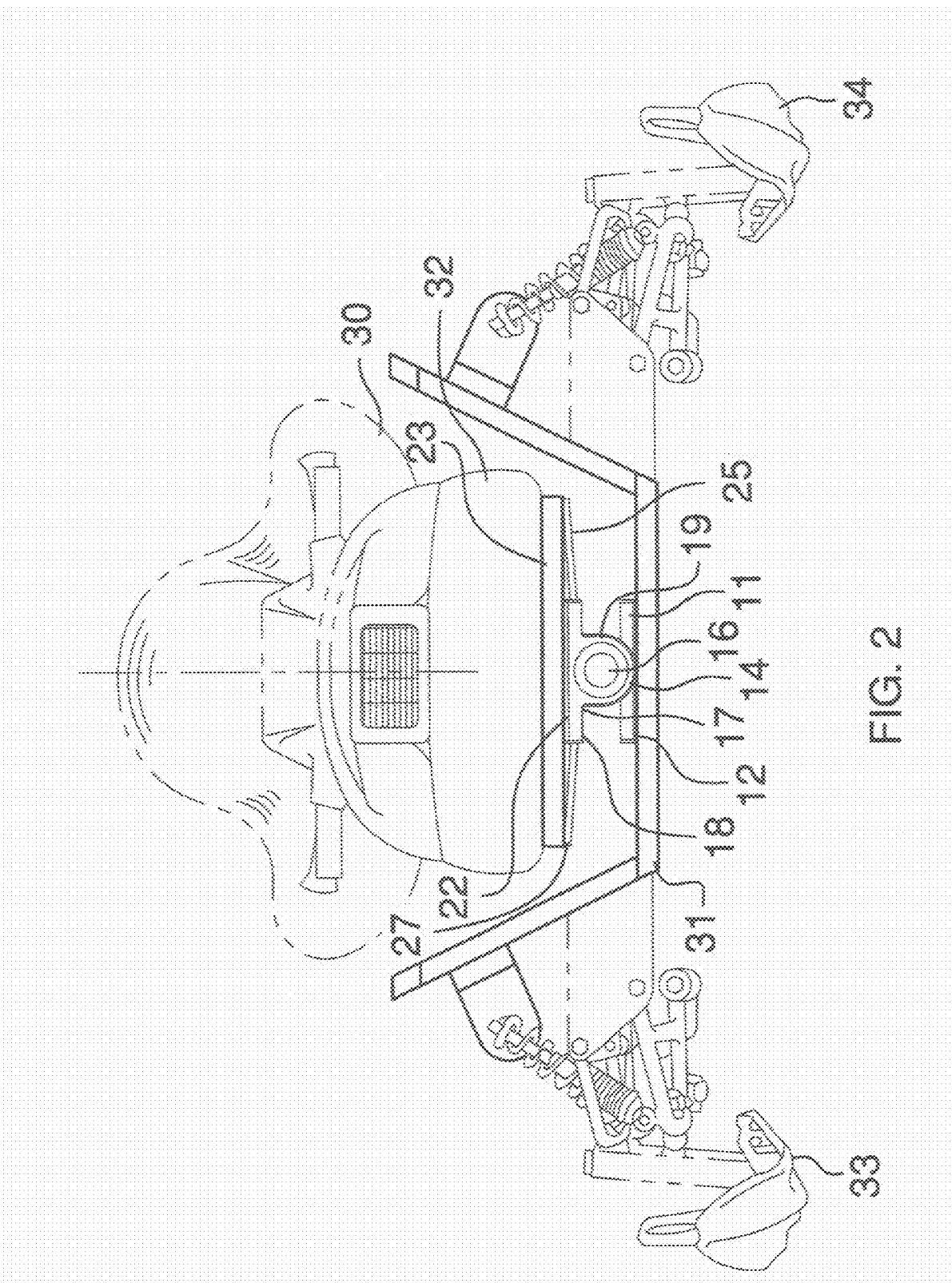
FIG. 2 is a front elevational view of the present invention.
Figure 3:
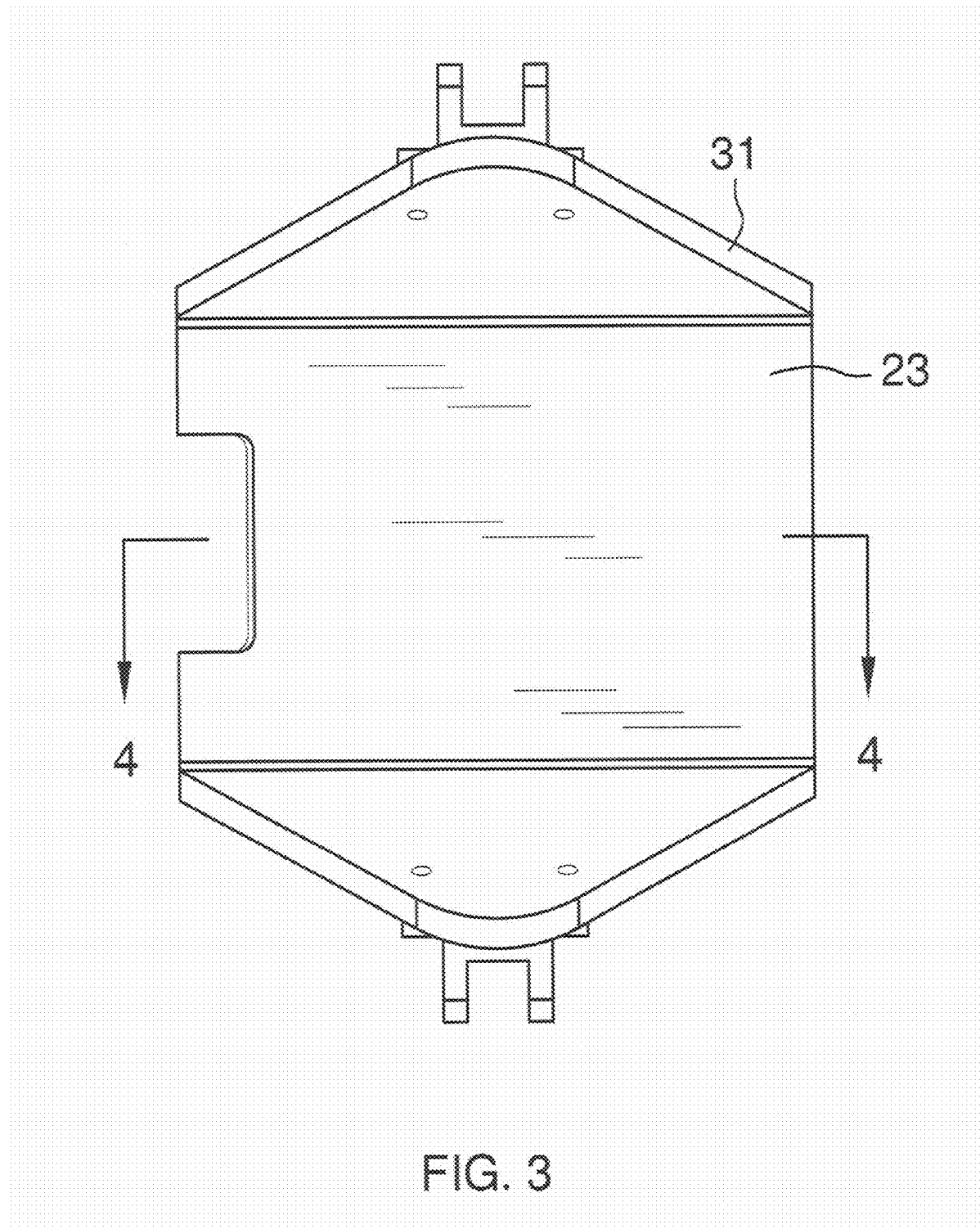
FIG. 3 is a top plan view of the present invention.
Figure 4:
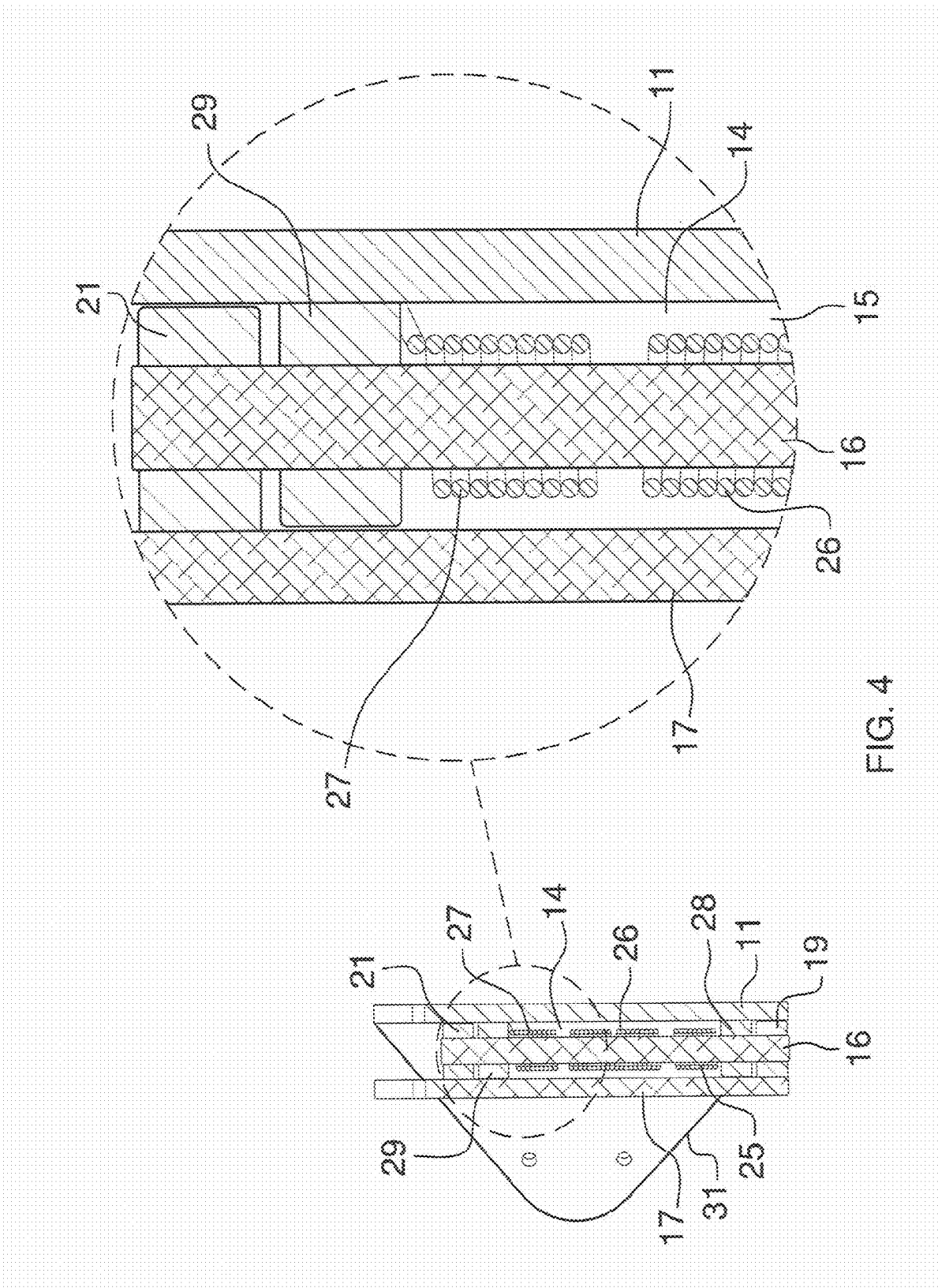
FIG. 4 is a longitudinal cross-sectional view of the present invention along line A-A of FIG. 3 with inset.

With reference now to the drawings, and in particular to FIGS. 1 through 4 thereof, a new snowmobile suspension embodying the principles and concepts of the present invention and generally designated by the reference numeral 10 will be described.

As best illustrated in FIGS. 1 through 4, the snowmobile suspension 10 generally comprises a base member 11 being securely and conventionally attached to a chassis 31 of a snowmobile 30, and also comprises a biased pivot assembly being securely supported upon the base member 11 and being conventionally attached to a body 32 of the snowmobile 30 which is biasedly pivotable relative to the chassis 31.

The base member 11 includes a bottom 12 being securely and conventionally attached upon the chassis 31 of the snowmobile 30 and also includes a channel 14 being disposed in a top 13 thereof. The channel 14 extends longitudinally of the chassis 31 of the snowmobile 30 and has a longitudinal axis which is disposed generally parallel to the body 32 of the snowmobile 30. The channel 14 has at least one beveled wall 15 forming the channel 14.

The biased pivot assembly includes an elongate shaft 16 being rotatably received in the channel 14 and also includes a support assembly being conventionally supported by the elongate shaft 16 and being pivotal relative to the base member 11 to allow the body 32 of the snowmobile 30 to laterally pivot relative to the chassis 31 and to generally prevent the snowmobile skis 33,34 from riding up on their edges. The elongate shaft 16 has a longitudinal axis which is disposed generally parallel to the body 32 of the snowmobile 30 with the elongate shaft 16 being rotatable about its longitudinal axis.

The support assembly includes a support member 17 being conventionally supported by the elongate shaft 16 for rotation therewith. The support member 17 includes attachment portions 19,21 integrally extending therefrom and being conventionally supported by the elongate shaft 16. The attachment portions 19,21 extend from a bottom 18 of the support member 17 and is disposed in the channel 14. Each attachment portion 19,21 has a beveled outer surface to effectively rotate in the channel 14. Each attachment portion 19,21 has an inverted arch-shape and has a bore 20 being disposed therethrough. The elongate shaft 16 has a portion being engaged in the bore 20. The support assembly also includes a mounting bracket 23 being conventionally attached upon a top 22 of the support member 17 and being conventionally attached to the body 32 of the snowmobile 30. The mounting bracket 23 which is essentially a mounting plate is conventionally attached to a bottom of a hull of the snowmobile 30 to allow the body 32 of the snowmobile 30 to pivot laterally relative to the chassis 31 so that a user can better maintain control of the snowmobile 30 over moguls and around corners without riding up on the edges of the skis 33,34.

The biased pivot assembly further includes one or more biased elements 25-27 being engagably and conventionally disposed about the elongate shaft 16 and being conventionally connected to the base member 11 to bias the mounting bracket 23 in a generally horizontal position. The biased pivot assembly also includes bushings 28,29 being securely and conventionally disposed in the channel 14 with portions of the elongate shaft 16 being rotatably disposed through the bushings 28,29.

In use, the user maintains control of the snowmobile 30 through corners and over moguls as such without the snowmobile 30 throwing off the user. The user pivots the body 32 of the snowmobile 30 through corners without riding up on the edges of the skis 33,34 thus preventing the skis 33,34 from grabbing the ground and causing the user to be jostled from the snowmobile 30. The user simply leans into the corner with the body 32 of the snowmobile 30 pivoting relative to the chassis 31 thus allowing the skis 33,34 to ride on their bottoms rather than on their edges, because the biased pivot assembly which supports the body 32 of the snowmobile 30 pivots relative to the base member 11. The biased elements 25-27 always urges the mounting bracket 23 back to an upright horizontal position so that the user can maintain control of the snowmobile 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the snowmobile suspension. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A snowmobile suspension comprising:
   a base member being attached to a chassis of a snowmobile, said base member including a channel being disposed in said base member; and
   a biased pivot assembly being supported by said base member and being attached to a body of the snowmobile which is biasedly pivotable relative to the chassis, said biased pivot assembly including an elongate shaft being rotatably received in said channel and also including a support assembly being supported by said elongate shaft and being pivotal relative to said base member to allow the body of the snowmobile to laterally pivot relative to the chassis and to generally prevent the snowmobile skis from riding up on their edges, said support assembly including a support member being supported by said elongate shaft, said support assembly also including a mounting bracket being attached upon said support member and being attached to the body of the snowmobile, said biased pivot assembly further including one or more biased elements being engagably disposed about said elongate shaft to bias said mounting bracket and the body of the snowmobile in a generally horizontal position.

2. The snowmobile suspension as described in claim 1, wherein said one or more biased elements is connected to said base member to bias said mounting bracket and the body of the snowmobile, in a generally horizontal position.

3. A snowmobile suspension comprising:
   a base member being attached to a chassis of a snowmobile, said base member including a channel being disposed in said base member; and
   a biased pivot assembly being supported by said base member and being attached to a body of the snowmobile which is biasedly pivotable relative to the chassis, said biased pivot assembly including an elongate shaft being rotatably received in said channel and also including a support assembly being supported by said elongate shaft and being pivotal relative to said base member to allow the body of the snowmobile to laterally pivot relative to the chassis and to generally prevent the snowmobile skis from riding up on their edges, said biased pivot assembly also including bushings being securely disposed in said channel with said elongate shaft being rotatably disposed through said bushings.

\* \* \* \* \*